(12) United States Patent
Kim

(10) Patent No.: US 6,871,393 B2
(45) Date of Patent: Mar. 29, 2005

(54) APPARATUS FOR ASSEMBLING PISTON IN SWASH PLATE TYPE COMPRESSOR

(75) Inventor: Kiyeon Kim, Daejeon-si (KR)

(73) Assignee: Halla Climate Control Corporation, Daejeon-Si (KR)

( * ) Notice: Subject to any disclaimer, the term of this patent is extended or adjusted under 35 U.S.C. 154(b) by 0 days.

(21) Appl. No.: 10/442,779

(22) Filed: May 21, 2003

(65) Prior Publication Data

US 2003/0217459 A1 Nov. 27, 2003

(30) Foreign Application Priority Data

May 21, 2002 (KR) .................................. 10-2002-0028057

(51) Int. Cl.[7] ................................................. B23P 21/00
(52) U.S. Cl. ........................... 29/714; 29/700; 29/281.4; 29/888.044; 92/128
(58) Field of Search ..................... 29/888.044, 888.041, 29/888.04, 714, 700, 281.1, 281.4, 281.5, 222; 92/128

(56) References Cited

U.S. PATENT DOCUMENTS

| 3,793,718 | A | * | 2/1974 | Okazaki | 29/256 |
| 3,952,393 | A | * | 4/1976 | van Ravenzwaay et al. | 29/795 |
| 4,794,690 | A | * | 1/1989 | Yamanaga et al. | 29/709 |
| 4,887,341 | A | * | 12/1989 | Sakimori et al. | 29/888.01 |
| 5,974,650 | A | * | 11/1999 | Kawabata et al. | 29/468 |
| 6,047,472 | A | * | 4/2000 | Koch et al. | 29/888.01 |
| 6,138,340 | A | * | 10/2000 | Yoshida | 29/468 |
| 6,343,540 | B1 | | 2/2002 | Ota et al. | |
| 6,367,141 | B1 | * | 4/2002 | Cook et al. | 29/407.1 |
| 6,467,155 | B1 | * | 10/2002 | Cook et al. | 29/714 |
| 6,591,484 | B2 | * | 7/2003 | Cook et al. | 29/709 |
| 6,658,713 | B1 | * | 12/2003 | Wittum et al. | 29/267 |
| 6,687,993 | B1 | * | 2/2004 | Bertin et al. | 29/888.044 |
| 2004/0194296 | A1 | * | 10/2004 | Kosugue et al. | 29/714 |

FOREIGN PATENT DOCUMENTS

| EP | 1 061 248 A2 | 12/2000 |
| JP | 2001-3859 | 1/2001 |

* cited by examiner

Primary Examiner—Essama Omgba
(74) Attorney, Agent, or Firm—Fulbright & Jaworski L.L.P.

(57) ABSTRACT

A piston assembling apparatus for a swash plate type compressor has a cylinder block-fixing means; vacuum absorbing means; absorbing angle-maintaining means capable of entering the cylinder bores from under the cylinder block and leaving out of the same; assembly-descending means, and elevating/descending for elevating the absorbing angle-maintaining means into the cylinder bores to contact the absorbing angle-maintaining face with a lower end of each of the pistons and for descending the absorbing angle-maintaining means at a rate substantially equal to a descending rate of the assembly-descending means at actuation of the assembly-descending means.

15 Claims, 6 Drawing Sheets

Prior Art

Prior Art

APPARATUS FOR ASSEMBLING PISTON IN SWASH PLATE TYPE COMPRESSOR

BACKGROUND OF THE INVENTION

1. Field of the Invention

The present invention relates to an apparatus for assembling a piston in a swash plate-type compressor which automatically assembles the piston to enhance performance and productivity of the compressor.

2. Background of the Related Art

A compressor in an air conditioning system for a vehicle selectively receives, via engagement/disengagement of an electromagnetic clutch, power of an engine transmitted through a pulley of a vehicle. The compressor inhales refrigerant, which is heat exchanged in an evaporator, compresses the refrigerant through a linear reciprocating motion, and then dispenses the compressed refrigerant to a condenser.

Such compressors are of various types, which are generally divided into reciprocating and rotary compressors according to compressing methods and structures. The reciprocating compressors include in particular a crank, swash plate and wobble plate type compressors. The rotary compressors include vein rotary and scroll type compressors. These compressors also include a variable capacity compressor which can vary its compressing capacity.

A prior art of the variable capacity compressor is disclosed in Japanese Patent Application Laid-Open No. 2001-3859.

Herein, description will be made about an assembling apparatus related to the present invention instead of the entire structure of a swash plate type compressor having variable capacity.

As shown in FIG. 1, a driving shaft 16 is supported by a driving shaft supporting jig 44 in an assembly Pa including the driving shaft 16, a rotor 17, pistons 22 and a swash plate 18, and then the pistons 22 are supported by a piston supporting jig 45.

Positioning portions 43 of a positioning jig 41 are inserted into cylinder bores 33 of a cylinder block 12 so that positioning projections 43a formed at ends of the positioning portions 43 are engaged into positioning grooves 22c in the pistons 22.

Where the positioning projections 43a are engaged into the positioning grooves 22c, the cylinder block 12 moves slidingly in a direction indicated with an arrow in FIG. 2.

Then, in response to movement of the cylinder block 12, the piston-supporting jig 45 is separated from the pistons 22 so that the cylinder block 12 completely covers the pistons 22.

In the final stage, the positioning portions 43 are drawn out of the cylinder bores 33 of the cylinder block so as to complete the operation of assembling the pistons 22.

However, the foregoing prior art for assembling the compressor as above has the following problems:

First, the prior art allows the pistons 22 to be introduced into the cylinder bores 33 of the cylinder block 12 via engagement of the positioning projections 43a into the positioning grooves 22c. If the positioning grooves 22c and the positioning projections 43a are not correctly formed, respectively, in the pistons 22 and the positioning portions 43, it is impossible to engage the positioning projections 43a into the positioning grooves 22c and thus to assemble the pistons into the bores.

As a result, it is required to precisely form the positioning projections and the positioning grooves which enable the above-mentioned assembling operation. In particular, it is difficult to form the positioning grooves in piston bodies and the forming cost is excessive.

Second, after forming the positioning grooves and the positioning projections, an additional operation is needed to test whether the grooves and the projections are formed in correct positions.

Third, because the operation of assembling the pistons is not provided with a separate greasing device, the pistons are not easily assembled into the cylinder bores of the cylinder block.

Fourth, since the positioning grooves are directly formed in the piston bodies, endurance and compressibility of the pistons are remarkably degraded thereby deteriorating performance of the compressor.

SUMMARY OF THE INVENTION

The present invention has been made in order to solve the foregoing problems, and it is an object of the present invention to provide a piston assembling apparatus in a swash plate type compressor which can automatically assemble pistons into cylinder bores thereby enhancing efficiency and productivity in an assembling operation.

Another object of the present invention is to provide a piston assembling apparatus in a swash plate type compressor which can automatically assemble the pistons without trimming bodies thereof so as to enhance endurance and compressibility of the pistons, thereby ensuring reliability in performance of the compressor.

In order to accomplish the above objects, according to an aspect of the invention, it is provided a piston assembling apparatus in a swash plate type compressor, which has a rotor and a swash plate on a driving shaft, for assembling a plurality of pistons coupled to the swash plate into a number of cylinder bores of a cylinder block having a center bore together with the cylinder bores. The piston assembling apparatus comprises: cylinder block-fixing means for fixing the cylinder block in a space; vacuum absorbing means disposed in a position distanced to a predetermined height from an upper face of the cylinder block and for vacuum absorbing outer faces of the pistons so that the pistons are in positions from which the pistons can be inserted into the cylinder bores; absorbing angle-maintaining means having an absorbing angle-maintaining face in its upper end corresponding to lower faces of the pistons in order to maintain the absorbing angle of each of the pistons absorbed by the vacuum absorbing means, the absorbing angle-maintaining means capable of entering the cylinder bores from under the cylinder block and leaving out of the same; assembly-descending means for pressing an upper end of the driving shaft to descend the assembly including the rotor, the swash plate and the pistons toward the cylinder blocks so that the pistons are introduced into the cylinder bores; and elevating/descending means for elevating the absorbing angle-maintaining means into the cylinder bores to contact the absorbing angle-maintaining face with a lower end of each of the pistons and for descending the absorbing angle-maintaining means at a rate substantially equal to a descending rate of the assembly-descending means at actuation of the assembly-descending means.

DETAILED DESCRIPTION OF THE PREFERRED EMBODIMENT

Reference will now be made in detail to the preferred embodiments of the present invention, examples of which are illustrated in the accompanying drawings.

Figure 1:
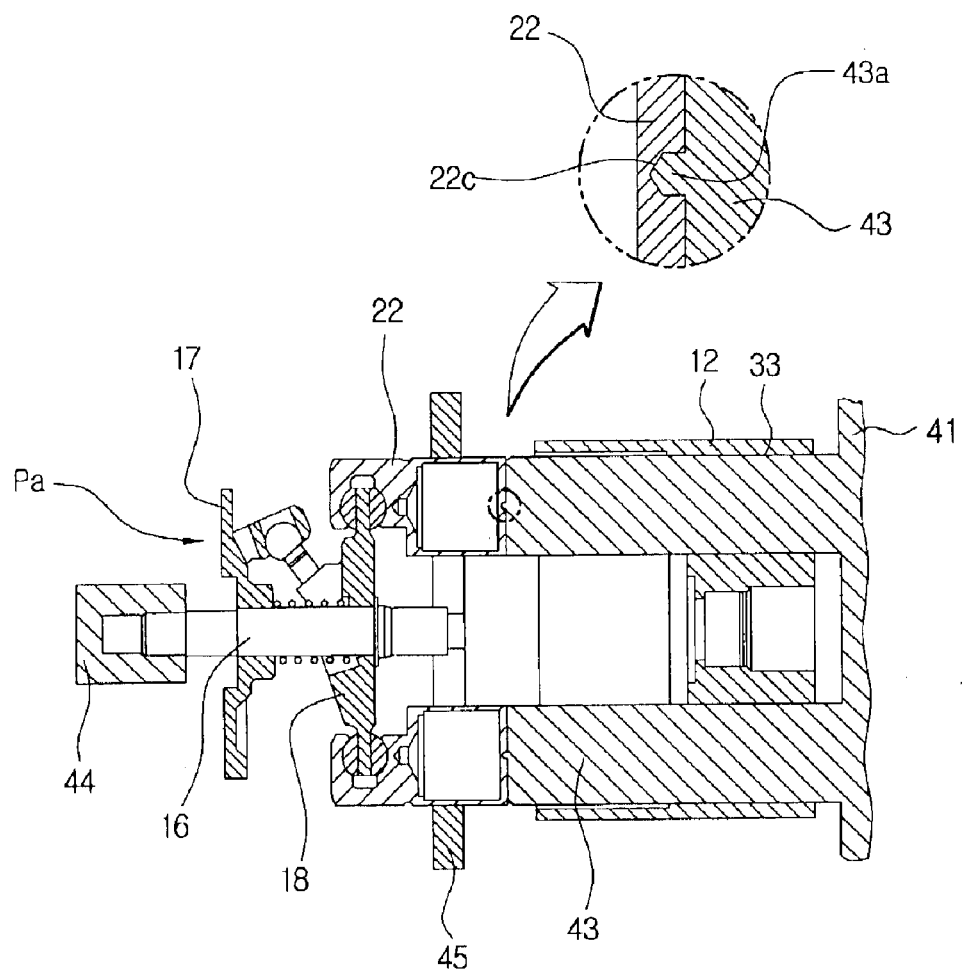
FIG. 1 illustrates an apparatus for assembling a piston of a swash plate type compressor according to the prior art.
Figure 2:
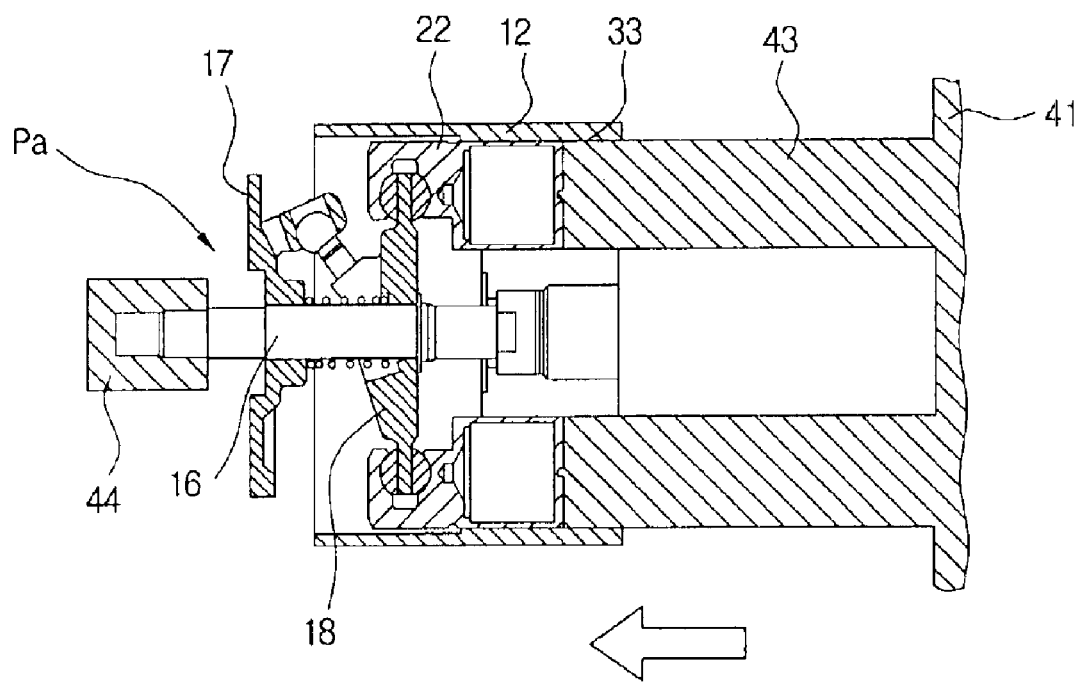
FIG. 2 illustrates the piston in FIG. 1 which has been completely assembled.
Figure 3:
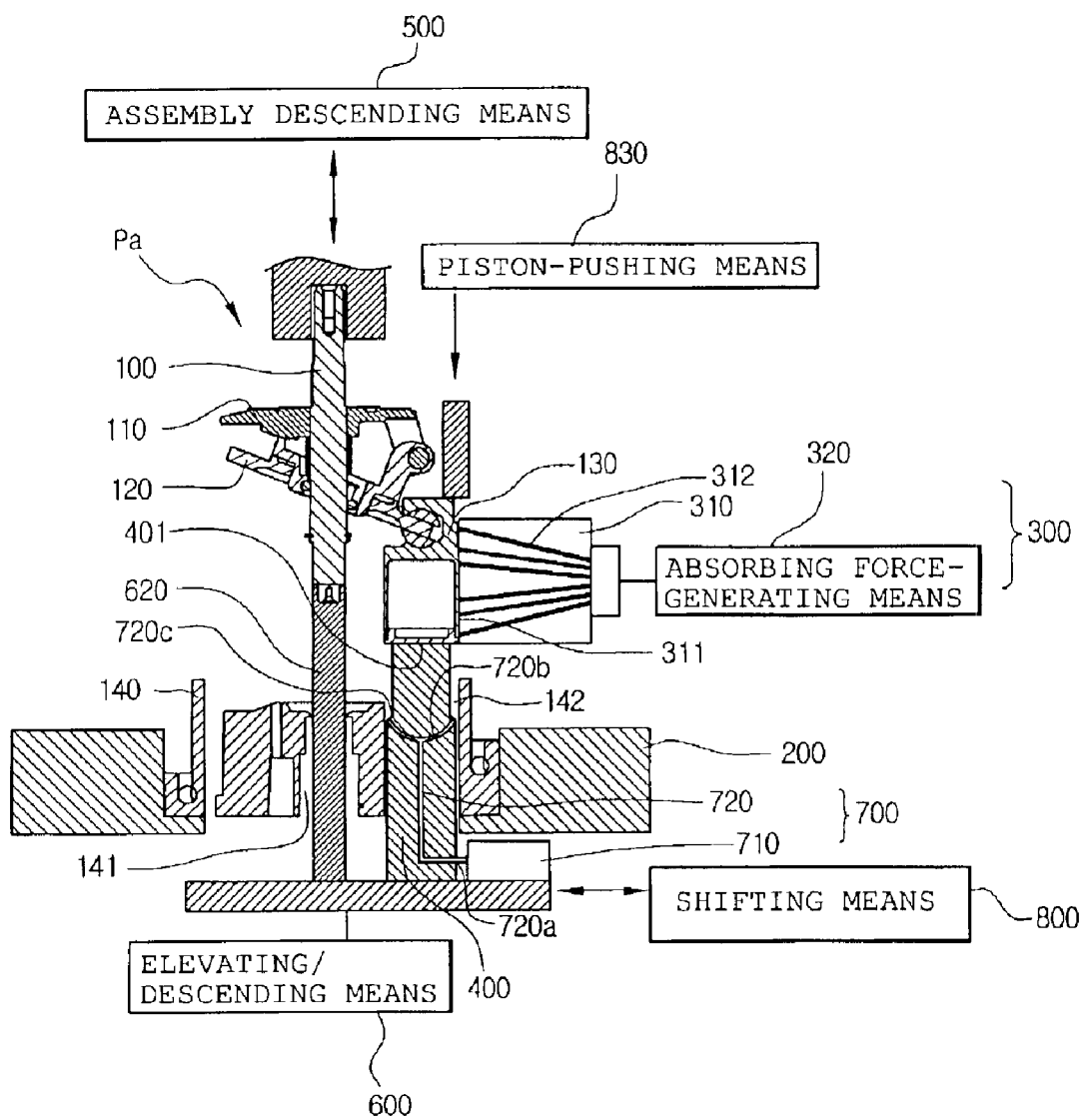
FIG. 3 illustrates a layout of an apparatus for assembling a piston in a swash plate type compressor according to the invention.
Figure 4:
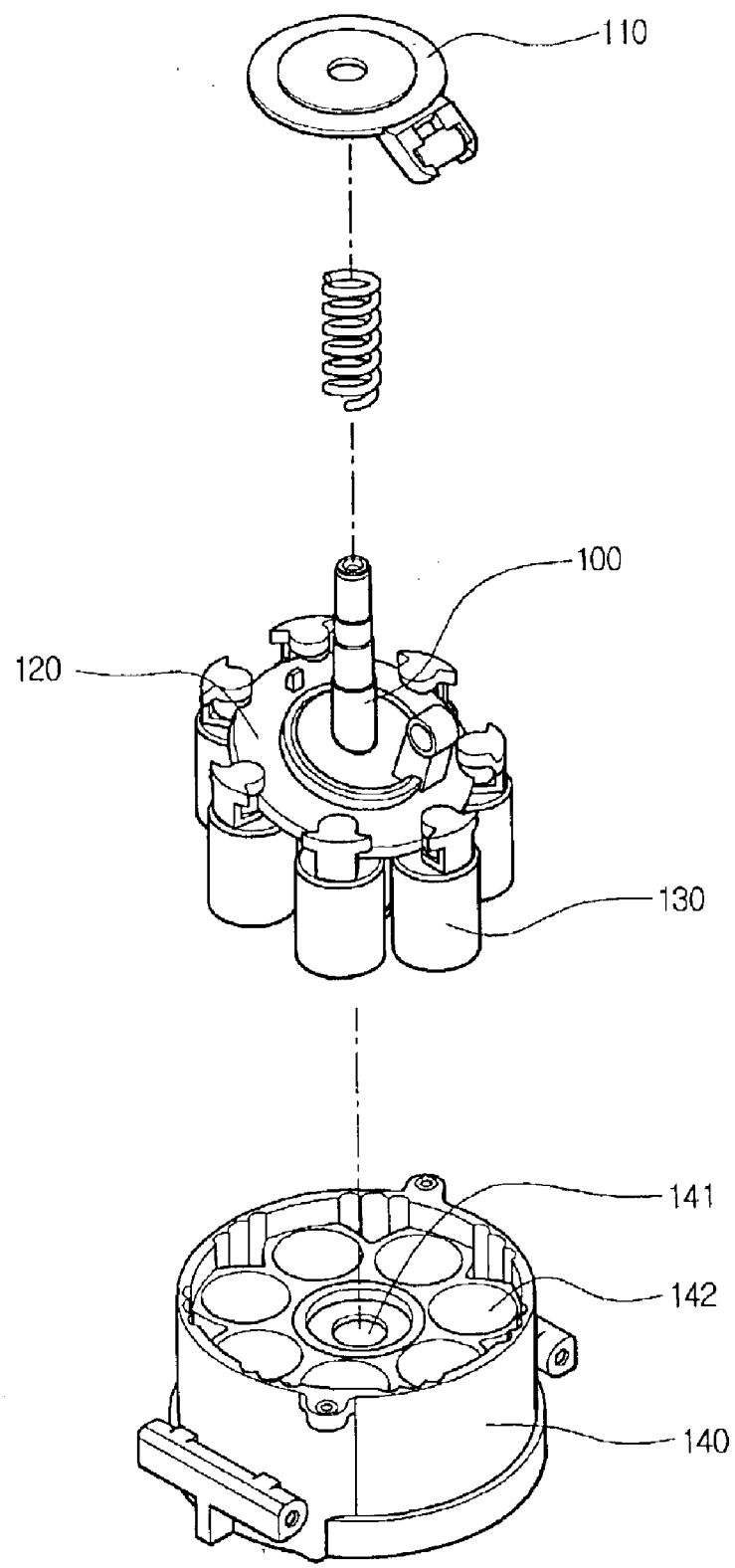
FIG. 4 is an exploded view illustrating a state in which the piston is assembled according to the invention.
Figure 5:
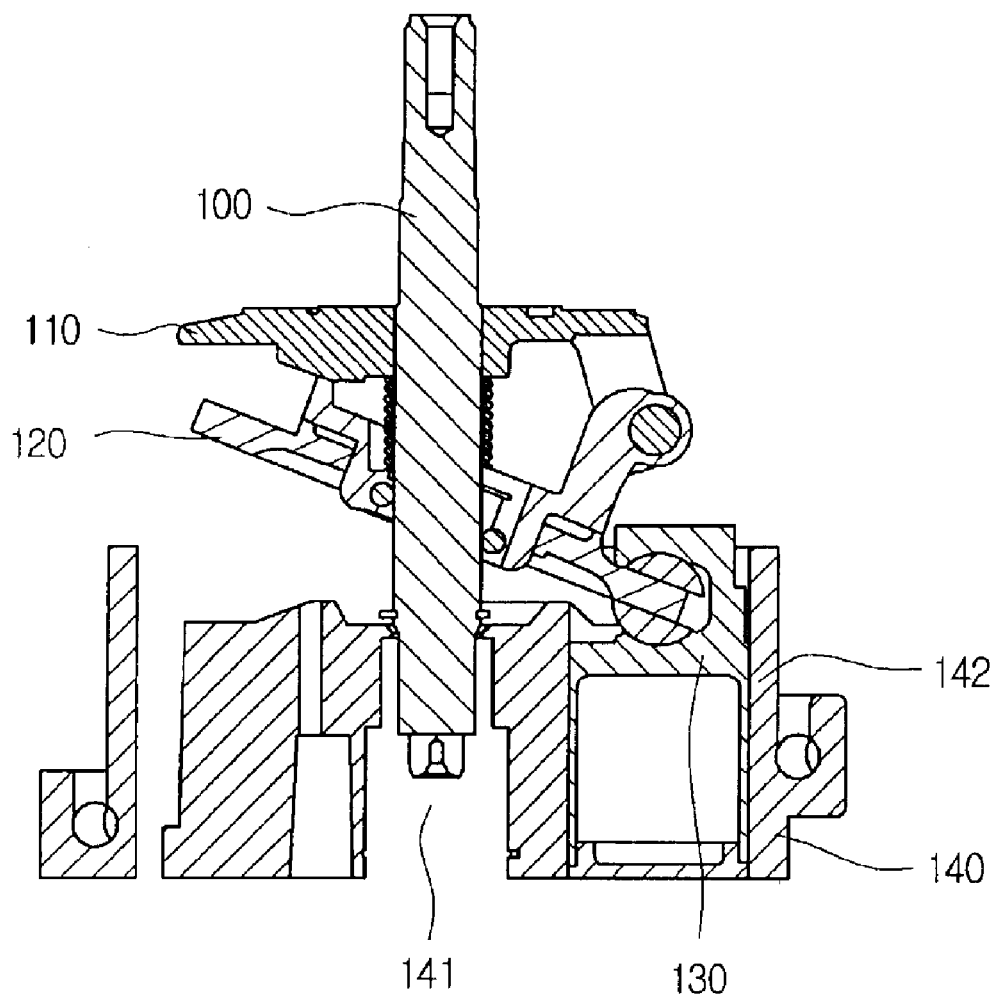
FIG. 5 is a longitudinal sectional view of the piston in FIG. 4 which has been completely assembled.

FIG. 3 illustrates a layout of an apparatus for assembling a piston in a swash plate type compressor according to the invention, FIG. 4 is an exploded perspective view illustrating a state in which the piston is assembled according to the invention, and FIG. 5 is a longitudinal sectional view of the piston in FIG. 4 which has been completely assembled.

Figure 6:
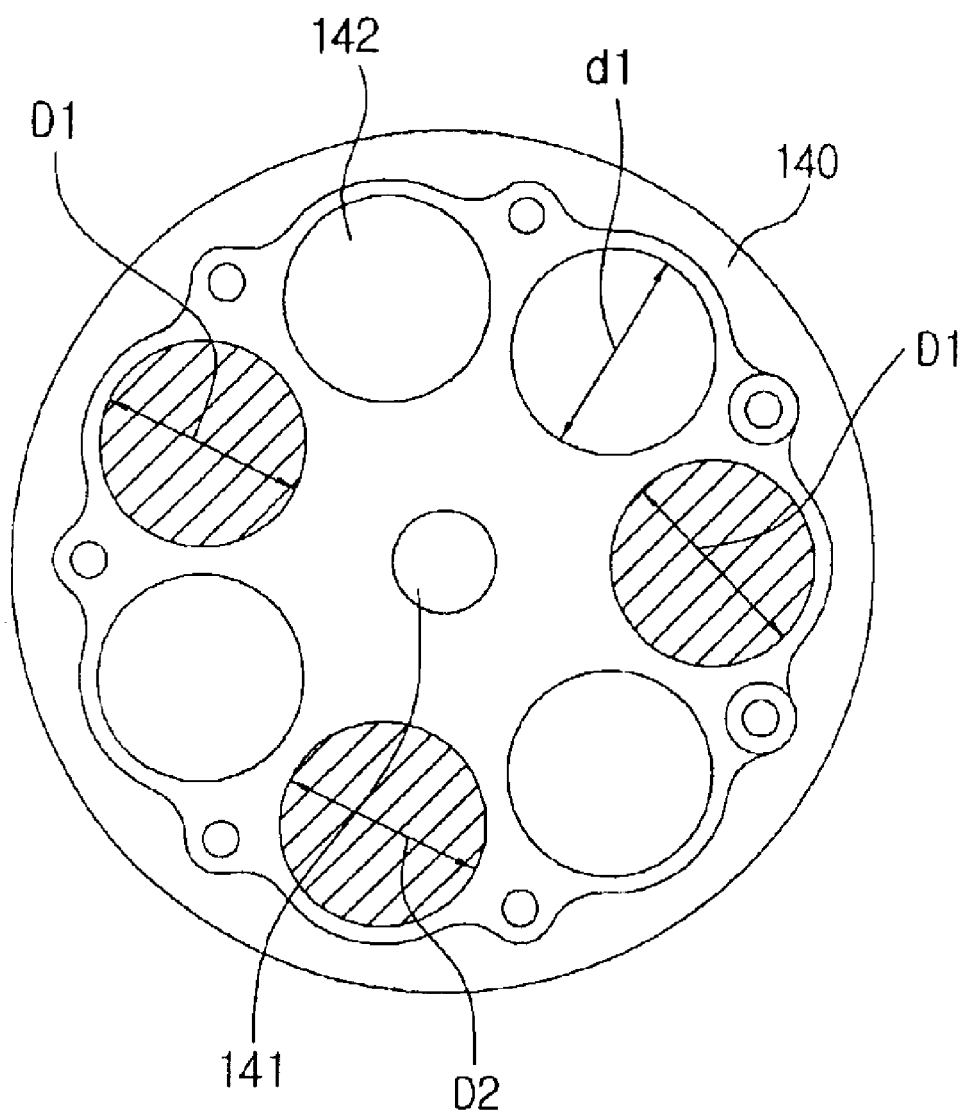
FIG. 6 illustrates the relation between means for maintaining an angle of absorption and cylinder bores according to the invention.

In the meantime, FIG. 6 illustrates the relation between means for maintaining an absorbing angle and cylinder bores according to the invention.

As shown in the drawings, a rotor 110 and a swash plate 120 are mounted on a driving shaft 100, a plurality of pistons 130 coupled with the swash plate 120, and a cylinder block 140 has a center bore 141 and a plurality of cylinder bores 142. The invention is directed to an apparatus for assembling each of the pistons 130 into each of the cylinder bores 142 of the cylinder block 140.

The assembling apparatus includes cylinder block fixing means 200, vacuum absorbing means 300 for the pistons, means 400 for maintaining an absorbing angle, means 500 for descending an assembly and elevating/descending means 600.

The cylinder block-fixing means 200 function to fix the cylinder block 140 in a space, and preferably fix the cylinder block 140 in a horizontal position.

The vacuum absorbing means 300 for the pistons are installed in such a manner as to be spaced apart, by a predetermined height, from the top of the cylinder block 140, and serve to vacuum absorb in part an outer face of each of the pistons 130 to a position where the each piston 130 can be inserted into each of the cylinder bores 142.

As an embodiment, the vacuum absorbing means 300 may include an absorbing member 310 having an absorbing face 311 formed in a concave configuration for surrounding the outer periphery of the piston 130 and an absorbing hole 312 formed in the absorbing member and absorbing force-generating means 320. The absorbing force-generating means 320 forcibly absorb/release air into/from the absorbing hole 312 to absorb/release the piston 130 to/from the absorbing face 311 via the absorbing member 310.

Preferably, the absorbing face 311 has an axial length equal to or larger than that of a body of the piston 130.

The absorbing angle-maintaining means 400 has an absorbing angle-maintaining face 401 opposed to a lower face of the piston 130 for maintaining the absorbing angle of the piston 130 absorbed by the vacuum absorbing means 300. The absorbing angle-maintaining means 400 are so constructed that it can be introduced into the cylinder bore 142 from under the cylinder block 140 and then drawn out of the same.

As not shown in the drawings, the vacuum absorbing means 300 may further include an absorbing path formed in the absorbing angle-maintaining face 401 so as to absorb the bottom surface of the piston 130 with the absorbing angle-maintaining face 401.

Although the foregoing embodiment has been described as the piston 130 is vacuum absorbed at both of the outer periphery and the bottom surface, the invention may further comprise absorbing force-generating means 320 for forcibly absorbing/releasing air into/from the absorbing path to absorb/release the bottom surface of the piston 130 to/from the absorbing angle-maintaining face 401 or the absorbing path in the absorbing angle-maintaining face 401 so that the bottom surface of the piston 130 alone can be vacuum absorbed.

The assembly-descending means 500 press an upper end of the driving shaft 100 to descend the assembly Pa including the driving shaft 100, the rotor 110 and the swash plate 120 toward the cylinder block 140 so that the piston 130 is introduced into the bore 142.

The elevating/descending means 600 elevate the absorbing angle-maintaining means 400 toward the inside of the cylinder bore 142 so that the absorbing angle-maintaining face 401 comes into contact with the lower end of the piston 130. In actuation of the assembly-descending means 500, the elevating/descending means 600 serve to descend the absorbing angle-maintaining means 400 at a rate substantially equal to that of the assembly-descending means 500.

Hereinbefore the basic structure of the assembling apparatus of the invention has been described.

The invention may further include oil dispensing means 700 in addition to the above basic structure, in which the oil dispensing means 700 serve to grease the inner periphery of the cylinder bore of the cylinder block 140 when the absorbing angle-maintaining means 400 are elevated by the elevating/descending means 600.

The oil dispensing means 700 includes an oil injector 710 for injecting oil and an oil channel 720 having an inlet 720a formed in a lower portion thereof and an outlet 720b formed in an upper portion thereof so that oil injected from the oil injector 710 is introduced into the oil channel 720. In this case, the oil channel 720 is formed in the absorbing angle-maintaining means 400.

In the meantime, a step 720c is formed in an outer surface of the absorbing angle-maintaining means 400 corresponding to the outlet 720b of the oil channel 720 in order to form a gap from the inner periphery of the cylinder bore 142.

The invention may further include shifting means 800 for laterally shifting the absorbing angle-maintaining means 400 and the elevating/descending means 600 in order to correctly position the arrangement of the cylinder bore 142.

In the assembling apparatus of the invention having the foregoing basic structure, the oil dispensing means 700 and/or the shifting means 800, the elevating/descending means 600 includes a shaft guide 620. The guide shaft 620 is inserted into the center bore 141 in an elevatable/descendable fashion, with its upper end being detachable from a lower end of the driving shaft 100, and guides the driving shaft 100 to be introduced into the center bore 141.

In the meantime, in addition to the above technical means such as the basic structure, the oil dispensing means 700, the shifting means 800 and/or the shaft guide 620, the invention may further include piston-pushing means 830 installed, respectively, over the plurality of pistons 130 for moving the pistons with a predetermined force.

Further, the invention may further include technical means for aligning cylinder bores 142 as shown in FIG. 6.

In the construction of the invention including the above basic structure, the oil dispensing means 700, the shifting means 800, the shaft guide 620 and/or the piston-pushing means 830, at least two of the absorbing angle-maintaining means 400 inserted into the cylinder bores 142 have an outside diameter D1 larger than that D2 of the remaining ones of the absorbing angle-maintaining means 400 but smaller than an inside diameter d1 of the cylinder bores 142 to satisfy an equation D2<D1<d1 so that the cylinder bores 142 can be aligned when the absorbing angle-maintaining means 400 are inserted into the cylinder bores 142.

Preferably, the two absorbing angle-maintaining means 400 having the outside diameter larger than that of the other absorbing angle-maintaining means 400 are located at the farthest positions or substantially on a diagonal.

Although the piston-pushing means 830 and the assembly-descending means 500 has been separately formed, they may be integrally formed instead.

The invention has been described so far with reference to an embodiment where the pistons 130 are assembled into the cylinder bores as the driving shaft 100, the pistons 130 and the cylinder bores 142 are vertically arranged. However, air absorbing paths may be formed within the absorbing angle-maintaining means 400 to be connected to the absorbing force-generating means 320 as well as exposed to the absorbing angle-maintaining face 401. As a result, the pistons 130 can be assembled into the cylinder bores 142 as the driving shaft 100, the pistons 130 and the cylinder bores 142 are horizontally arranged.

In other words, the present invention can assemble the pistons 130 into the cylinder bores 142 in a vertical or horizontal position by rotating the assembling apparatus into a horizontal or vertical position.

The following description will represent a process of assembling the pistons with the assembling apparatus of the invention constructed as above will be described in detail hereinafter.

The assembling process of the pistons will be described on the basis of the embodiment which is provided with all of the foregoing constructions of the assembling apparatus.

First, the rotor 110 and the swash plate 120 are mounted on the driving shaft 100, the assembly Pa including a plurality of pistons 130 coupled to the swash plate 120 are provided, and then the upper end of the driving shaft 100 of the assembly Pa is mounted on the assembly-descending means 500.

The cylinder block 140 is mounted on the cylinder block-fixing means 200 so that the cylinder block 140 be in a horizontal position in any space.

The cylinder block 140 is fixedly mounted by the cylinder block-fixing means 200 on a point where the cylinder bore 142 and the piston 130 have a tendency to align with each other in a vertical direction.

Then, the absorbing operation is performed with the vacuum absorbing means 300 to vertically align the piston 130 with the cylinder bore 142.

The absorbing operation will be described in more detail as follows.

When the absorbing force-generating means 320 are operated to strongly absorb air via the absorbing hole 312 of the absorbing member 310, the outer periphery of the piston 130 is absorbed to the absorbing face 311 of the absorbing member 310 so that the piston 130 is vertically aligned with the cylinder bore 142.

Preferably, the absorbing face 311 of the absorbing member 310 in the absorbing force-generating means 320 is vertically aligned with the cylinder bore 142 of the cylinder block 140.

Upon completing the absorbing operation of the piston 130, the elevating/descending means 600 are operated to elevate the absorbing angle-maintaining means 400 and the shaft guide 620 from the lower portion of the cylinder block 140 to the upper portion thereof.

The absorbing angle-maintaining face 401 corresponding to the upper face of the absorbing angle-maintaining means 400 is elevated by the elevating/descending means 600 to come into contact with the lower face of the piston 130. As a result, the piston 130 is fixed in its position so that it can be inserted into the cylinder bore 142.

After the lower face of the piston 130 comes into contact with the absorbing angle-maintaining face 401, the absorbing force of the vacuum absorbing means 300 is not needed any longer. Then, the operation of the vacuum absorbing means 300 is stopped.

The upper end of the shaft guide 620 elevated simultaneous with the absorbing angle-maintaining means 400 via the elevating/descending means 600 is detachably coupled with the lower end of the driving shaft 100 via the cylinder bore 142 of the cylinder block 140.

When the shaft guide 620 and the absorbing angle-maintaining means 400 elevated by the elevating/descending means 600 contact the piston 130 and the driving shaft 100, respectively, it is required to stop the driving force of the elevating/descending means 600. To this end, preferably, the invention may include separate contact-detecting means (not shown).

Upon completing the operation of elevating the shaft guide 620 and the absorbing angle-maintaining means 400, the assembly-descending means 500 are operated to slowly descend the assembly Pa.

Herein, the piston-pushing means 830 may be further provided to descend along with the assembly-descending means 500.

Simultaneous with descending the assembly-descending means 500, the elevating/descending means 600 are actuated so that the shaft guide 620 and the absorbing angle-maintaining means 400 are also descended in a rate equal to that of the assembly-descending means 500.

When the shaft guide 620 and the absorbing angle-maintaining means 400 begin descending upon actuation of the elevating/descending means 600, the oil dispensing means 700 are actuated to grease the inner periphery of the cylinder bore 142 in the cylinder block 140.

As the oil injector 710 of the oil dispensing means 700 is operated, oil is introduced to the inlet 720a of the oil channel 720 and then dispensed to the outlet 720b. As a result, oil is applied on the inner periphery of the cylinder bore 142.

Since the position of the outlet 720b is identical with the step 720c formed in the absorbing angle-maintaining means 400, oil may be easily dispensed via the gap formed in the step 720c.

As descended along with the assembly Pa upon actuation of the assembly-descending means 500, the piston 130 begins being introduced into the cylinder bore 142.

The piston 130 can be more easily introduced into the cylinder bore 142 under an auxiliary pushing force of the piston-pushing means 830. Then, the assembling operation of the assembly Pa including the piston is completed as shown in FIG. 5.

According to the piston assembling apparatus in the swash plate type compressor of the invention as set forth above, the operation of assembling the piston into the cylinder bore is automated to remarkably enhance efficiency and productivity of the assembling operation.

Further, the invention enables the piston to be assembled without processing the piston body to enhance endurance and compressibility of the piston thereby ensuring reliability of the compressor.

Although the preferred embodiments of the invention have been described and illustrated to explain the principle of the invention, the invention is not restricted to the construction and the operation which are illustrated and described as they are.

Rather, those skilled in the art will readily understand that a number of alternatives and modification can be made without departing from the sprit and scope of the appended claims.

Therefore, those appropriate modifications, variations and equivalents should be considered to be within the scope of the present invention.

What is claimed is:

1. A piston assembling apparatus in a swash plate type compressor, which has a rotor and a swash plate on a driving shaft, for assembling a plurality of pistons coupled to the swash plate into a number of cylinder bores of a cylinder block having a center bore together with the cylinder bores, the apparatus comprising:

cylinder block-fixing means for fixing the cylinder block in a space;

vacuum absorbing means disposed in a position spaced apart by a predetermined height from a top surface of the cylinder block and for vacuum absorbing outer faces of the pistons so that the pistons are in positions where the pistons can be inserted into the cylinder bores;

absorbing angle-maintaining means having an absorbing angle-maintaining face in its upper end corresponding to lower faces of the pistons in order to maintain an absorbing angle of each of the pistons absorbed by the vacuum absorbing means, the absorbing angle-maintaining means capable of entering the cylinder bores from under the cylinder block and leaving out of the same;

assembly-descending means for pressing an upper end of the driving shaft to descend the assembly including the driving shaft, the rotor, the swash plate and the pistons toward the cylinder blocks so that the pistons are introduced into the cylinder bores; and elevating/descending means for elevating the absorbing angle-maintaining means toward the inside of the cylinder bores so that the absorbing angle-maintaining face comes into contact with a lower end of each of the pistons and for descending the absorbing angle-maintaining means at a rate substantially equal to a descending rate of the assembly-descending means upon actuation of the assembly-descending means.

2. A piston assembling apparatus in a swash plate type compressor as set forth in claim 1, further comprising oil dispensing means capable of greasing an inner periphery of each of the cylinder bores in the cylinder block when the absorbing angle-maintaining means are elevated/descended by the elevating/descending means.

3. A piston assembling apparatus in a swash plate type compressor as set forth in claim 2, wherein the oil dispensing means comprise:

an oil injector; and an oil channel formed within the absorbing angle-maintaining means and having an inlet and an outlet, whereby oil injected from the oil injector can be moved through the oil channel.

4. A piston assembling apparatus in a swash plate type compressor as set forth in claim 3, wherein a step is formed in an outer periphery of the absorbing angle-maintaining means corresponding to the outlet of the oil channel to form a gap from the inner periphery of each of the cylinder bores.

5. A piston assembling apparatus in a swash plate type compressor as set forth in claim 1, further comprising shifting means capable of simultaneously shifting the absorbing angle-maintaining means and the elevating/descending means to correspond to arrangement positions of the cylinder bores.

6. A piston assembling apparatus in a swash plate type compressor as set forth in claim 5, wherein the elevating/descending means further include a shaft guide which is inserted into the center bore in an elevatable/descendable fashion so that the driving shaft can be introduced into the center bore, the shaft guide having an upper end detachable from a lower end of the driving shaft.

7. A piston assembling apparatus in a swash plate type compressor as set forth in claim 1, wherein the vacuum absorbing means comprise:

an absorbing member having an absorbing face formed in a concave configuration for surrounding the outer periphery of each of the pistons and an absorbing hole formed within the absorbing face; and absorbing force generating means for forcibly absorbing/releasing air into/from the absorbing hole to absorb/release the pistons to/from the absorbing face via the absorbing member.

8. A piston assembling apparatus in a swash plate type compressor as set forth in claim 7, wherein the absorbing face has an axial length equal to or longer than that of a body of the each piston.

9. A piston assembling apparatus in a swash plate type compressor as set forth in claim 7, wherein the vacuum absorbing means further includes an absorbing path formed in the absorbing angle-maintaining face to absorb the bottom surface of the each piston.

10. A piston assembling apparatus in a swash plate type compressor as set forth in claim 1, wherein the vacuum absorbing means include:

an absorbing path formed in the absorbing angle-maintaining face; and absorbing force generating means for forcibly absorbing/releasing air into/from the absorbing path to absorb/release a bottom surface of the each piston to/from absorbing angle maintaining face.

11. A piston assembling apparatus in a swash plate type compressor as set forth in claim 1, wherein the elevating/descending means further include a shaft guide which is inserted into the center bore in an elevatable/descendable fashion so that the driving shaft can be introduced into the center bore, the shaft guide having an upper end detachable from a lower end of the driving shaft.

12. A piston assembling apparatus in a swash plate type compressor as set forth in claim 1, further comprising piston-pushing means disposed, respectively, over the pistons for pushing the pistons with a predetermined force.

13. A piston assembling apparatus in a swash plate type compressor as set forth in claim 12, wherein piston-pushing means and the assembly-descending means are integrally formed.

14. A piston assembling apparatus in a swash plate type compressor as set forth in claim 1, wherein at least two of the absorbing angle-maintaining means inserted into the cylinder bores have an outside diameter D1 larger than that outside diameter D2 of the remaining ones of the absorbing angle-maintaining means but smaller than an inside diameter d1 of the cylinder bores to satisfy an equation D2<D1<d1 so that the cylinder bores can be aligned when the absorbing angle-maintaining means are inserted into the cylinder bores.

15. A piston assembling apparatus in a swash plate type compressor as set forth in claim 14, wherein the at least two absorbing angle-maintaining means having the outside diameter larger than that of the other absorbing angle-maintaining means are located substantially on a diagonal one from the other.

* * * * *